(12) United States Patent  (10) Patent No.: US 8,172,509 B2
Bart et al.  (45) Date of Patent: May 8, 2012

(54) DEVICE FOR DETECTING BREAKAGE OF A TURBOMACHINE SHAFT

(75) Inventors: Jacques Rene Bart, Soisy sur Seine (FR); Didier Rene Andre Escure, Nandy (FR); Cedric Magret, Paris (FR); Stephane Rousselin, Hericy (FR)

(73) Assignee: SNECMA, Paris (FR)

( * ) Notice: Subject to any disclaimer, the term of this patent is extended or adjusted under 35 U.S.C. 154(b) by 724 days.

(21) Appl. No.: 12/270,345

(22) Filed: Nov. 13, 2008

(65) Prior Publication Data

US 2009/0123269 A1 May 14, 2009

(30) Foreign Application Priority Data

Nov. 13, 2007 (FR) ...................................... 07 07940

(51) Int. Cl.
*F04D 27/00* (2006.01)
(52) U.S. Cl. .......................................... 415/118; 73/510
(58) Field of Classification Search .................. 415/118; 73/510; 324/200; 434/183
See application file for complete search history.

(56) References Cited

U.S. PATENT DOCUMENTS

| 6,494,046 | B1 | 12/2002 | Hayess |
| 7,100,354 | B2 * | 9/2006 | Opper ........................ 60/39.091 |
| 2003/0091430 | A1 | 5/2003 | Mulera et al. |
| 2005/0047913 | A1 | 3/2005 | Rensch |

FOREIGN PATENT DOCUMENTS

| EP | 1 327 751 A1 | 7/2003 |
| GB | 2 256 486 A | 12/1992 |

* cited by examiner

*Primary Examiner* — Quoc Hoang
(74) *Attorney, Agent, or Firm* — Oblon, Spivak, McClelland, Maier & Neustadt, L.L.P.

(57) ABSTRACT

A device for detecting breakage of a turbomachine shaft is disclosed. The device includes a shaft having an upstream end and a downstream end; a rod having an upstream end and a downstream end, and placed coaxially inside the shaft, the downstream end of the rod being securely fastened to the downstream end of the shaft and the upstream end of the rod being free to rotate relative to the upstream and of the shaft; and a sensor suitable for detecting a difference in speed of rotation between the upstream end of the rod and the upstream end of the shaft.

11 Claims, 2 Drawing Sheets

DEVICE FOR DETECTING BREAKAGE OF A TURBOMACHINE SHAFT

The present invention relates to a device for detecting breakage of a shaft of a turbomachine, in particular of the aviation type. The invention relates in particular to a device designed to perform such detection.

BACKGROUND OF THE INVENTION

A turbomachine comprises a compressor, a combustion chamber, and a turbine. The compressor serves to increase the pressure of the air delivered to the combustion chamber. The turbine serves to deliver rotary drive to the compressor by extracting a fraction of the pressure energy from the hot gas that leaves the combustion chamber, and by transforming it into mechanical energy.

The compressor and the turbine are made up of a first set of parts that are stationary, constituting a stator, and a second set of parts that are suitable for being set into rotation relative to the stator, and constituting a rotor.

The rotor of the compressor and the rotor of the turbine form a unit that is securely interconnected by means of a rotary shaft. In the event of the shaft breaking, the mechanical connection between the rotor of the compressor and the rotor of the turbine is lost. Under such circumstances, the rotor of the turbine is suddenly subjected on its own to all of the energy coming from the combustion chamber without being able to transmit any of it to the rotor, and it therefore starts to race. The consequences of such racing or "overspeed" can be dangerous and can lead very quickly to the turbomachine self-destructing.

In order to contain such overspeed, various actions need to be taken urgently: firstly the fuel supply must be switched off to interrupt the supply of energy; and secondly the power to which the turbine rotor is subjected needs to be dissipated so as to reduce it. Dissipation can be achieved by deformation, friction, or destruction of the turbine rotor and/or the turbine stator. Examples of techniques for dissipating turbine rotor energy are described in the following documents: U.S. Pat. Nos. 4,498,291; 4,503,667; and 4,505,104.

In order to take urgent action effectively, it is necessary to detect as quickly as possible that the shaft has broken and to forward this information quickly to those members of the turbomachine that enable the urgent action to be taken, and in particular those that enable the fuel supply to be cut off.

One known device for detecting breakage of the turbomachine shaft consists in using a pair of speed sensors, each sensor being disposed close to a respective upstream or downstream end of the shaft. When the shaft is intact, the speeds measured by the two sensors are practically identical. An excessive difference between the speed of the compressor rotor as measured by the upstream speed sensor and the speed of the turbine rotor as measured by the downstream speed sensor is interpreted by a speed comparator as indicating that the shaft has broken. The comparator can then trigger the urgent actions that are required in order to avoid turbine rotor overspeed. Examples of such a device for detecting shaft breakage are described in documents GB 2 256 486 and U.S. Pat. No. 6,494,046.

Nevertheless, implanting a speed sensor close to the downstream end of the turbomachine rotor shaft is difficult since the turbine environment is severe because it is exposed to very high temperatures, given that the turbine is located immediately downstream from the combustion chamber.

Furthermore, using a plurality of speed sensors leads to a detector device that is relatively complex and increases the overall weight of the turbomachine. It is known that reducing weight is a constant concern in aviation.

OBJECT AND SUMMARY OF THE INVENTION

The object of the present invention is to propose a device for detecting breakage of a turbomachine rotor shaft, which device does not require a sensor to be installed in the vicinity of the turbine and enables the above-mentioned problems to be mitigated.

This object is achieved by implementing a device for detecting breakage of a turbomachine shaft, the device comprising:
  a shaft having an upstream end and a downstream end;
  a rod having an upstream end and a downstream end, and placed coaxially inside the shaft, the downstream end of the rod being securely fastened to the downstream end of the shaft and the upstream end of the rod being free to rotate relative to the upstream and of the shaft; and
  a sensor suitable for detecting a difference in speed of rotation between the upstream end of the rod and the upstream end of the shaft.

When the shaft is intact, the rod is driven to rotate at the same speed as the shaft by the downstream end of the rod being securely fastened to the downstream end of the shaft. Since this rotation is transmitted to the upstream ends of the rod and of the shaft, the upstream end of the rod rotates at the same speed as the shaft.

In the event of the shaft breaking, the rod continues to be driven to rotate at the same speed as the downstream end of the shaft. Since rotation of the downstream end of the shaft is no longer properly transmitted to the upstream end of the shaft, phase shift arises between the upstream end of the rod and the upstream end of the shaft. The sensor measuring the speed of the upstream end of the rod relative to the upstream end of the shaft detects this phase shift, and this is interpreted as representing breakage of the shaft.

Advantageously, the device of the invention for detecting breakage of a turbomachine shaft involves a reduction in weight. It avoids installing a sensor on a turbomachine in the region of the turbine. Better control over detecting shaft breakage avoids making use of heavy mechanical means for dissipating energy in the turbine.

Advantageously, the device of the invention for detecting breakage of a turbomachine shaft is simpler since it requires only one sensor, unlike prior art devices that require two sensors. Furthermore, the electronic means for processing the signal detected by the sensor are likewise simplified since it is no longer necessary, for example, to make use of a speed comparator.

BRIEF DESCRIPTION OF THE DRAWINGS

The invention is described in greater detail below showing more clearly its other characteristics and advantages with reference to the following figures in which, respectively.

MORE DETAILED DESCRIPTION

Figure 1:
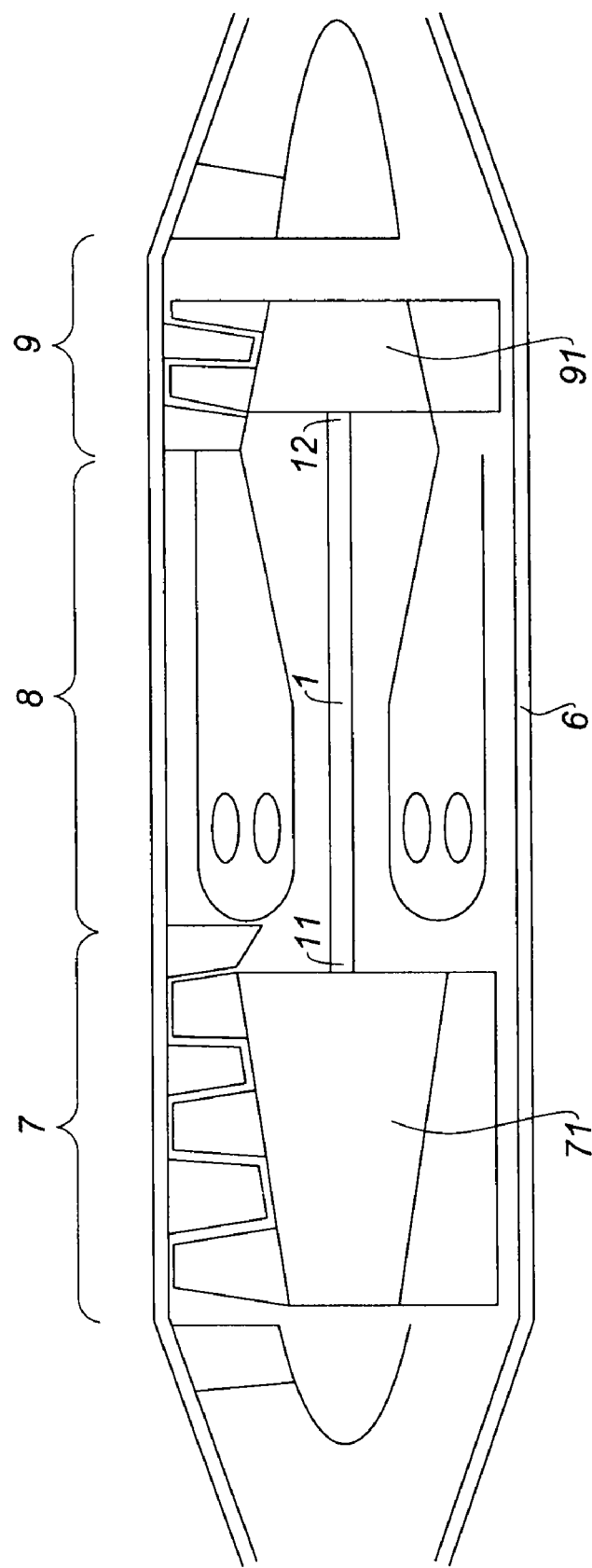
FIG. 1 is a diagrammatic view of a turbomachine.

FIG. 1 is a diagram of a turbomachine comprising a stationary casing 6 constituting a portion of the stator, a compressor 7, a combustion chamber 8, and a turbine 9. The compressor 7 includes a compressor rotor 71 and the turbine 9 includes a turbine rotor 91. The compressor rotor 71 and the turbine rotor 91 are interconnected by a shaft 1, the compressor rotor 71 being fastened securely to the upstream end 11 of the shaft 1, and the turbine rotor 91 being fastened securely to the downstream end 12 of the shaft 1. "Upstream" and "downstream" are defined relative to the flow direction of the stream of fluid passing through the turbine.

Figure 2:
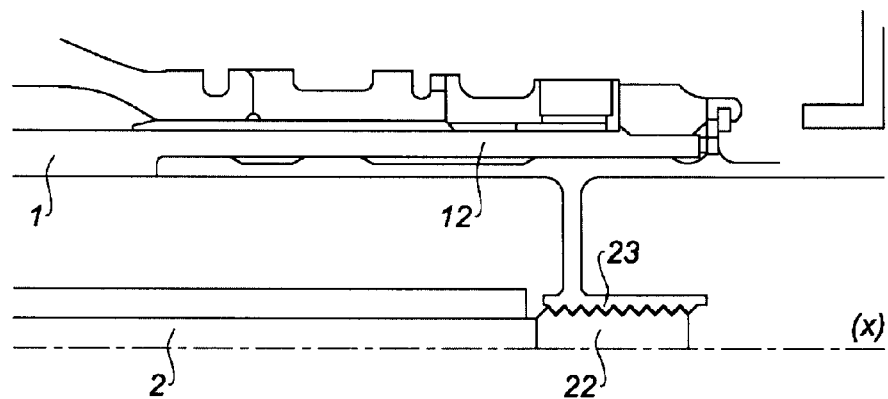
FIG. 2 is a section view of the downstream end of the shaft-breakage detector device of the invention.

FIG. 2 shows the downstream end of the device of the invention for detecting breakage of the shaft 1, which device is constituted in part by a shaft 1 and a rod 2, i.e. a part that is thin and elongate. The shaft 1 is conventionally of tubular shape, i.e. in the form of a hollow cylinder, and it presents an axis of revolution (X) that also corresponds to the axis of rotation of the turbomachine.

The rod 2 is placed inside the shaft 1 and extends through it along its length in coaxial manner. The downstream end 12 of the shaft and the downstream end 22 of the rod are securely fastened together. Various means 23 can be envisaged for achieving this fastening, e.g. adhesive, welding, bolting, screw-fastening, or mechanical meshing. The fastening must be such that the downstream end 12 of the shaft 1 is constrained to entrain rotation of the downstream end 22 of the rod 2. It is therefore also possible to make use of pins or keys.

When making use of screw-fastening, it is important that the screw-tightening direction be such that rotation of the shaft 1 contributes to reinforcing screw engagement between the downstream end 22 of the rod 2 and the downstream end 12 of the shaft 1, since rotation in the opposite direction would run the risk of giving rise to unscrewing, thereby separating the two parts and thus losing rotary drive of one of the parts by the other. For screw engagement, the downstream end 12 of the shaft 1 may include tapping that co-operates with a thread situated on the downstream end 22 of the rod 2.

When fastening by means of mechanical meshing, the downstream end 12 of the shaft 1 and the downstream end 22 of the rod 2 may include complementary splines 23. The use of splines 23 is advantageous in that it makes it easy to insert and fasten the rod 2 from the upstream end 11 of the shaft 1.

Figure 3:
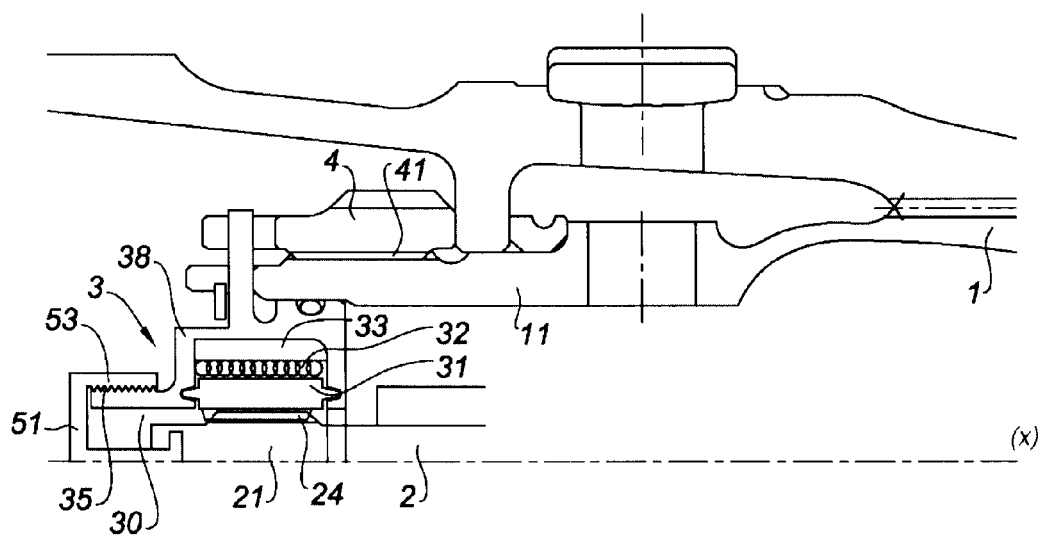
FIG. 3 is a section view of the upstream end of the shaft-breakage detector device of the invention.

FIG. 3 shows the upstream end of the device of the invention for detecting breakage of the shaft 1, which device is constituted by the shaft 1, the rod 2, and a sensor 3 suitable for measuring the speed of the upstream end 21 of the rod 2 relative to the upstream end 11 of the shaft 1.

The sensor 3 comprises a housing 38 and it is securely fastened to the upstream end 11 of the shaft 1. Various means 4 can be envisaged for achieving this fastening, for example adhesive, welding, bolting, screw-fastening, or mechanical meshing. One possible fastener means 4 may be constituted by a nut 4 secured to the sensor 3 and capable of screwing onto the upstream end 11 of the shaft 1. FIG. 3 shows an embodiment in which this fastening is screw-fastening.

The sensor 3 is essentially in the form of a hollow cylinder coaxial with the shaft 1. The hollow inside 30 of the sensor 3 serves to receive the upstream end 21 of the rod 2, which end is free to rotate relative to the sensor 3 and relative to the upstream end 11 of the shaft 1.

The sensor 3 shown in FIG. 3 is of the electromagnetic induction type. Inside the housing 38 it comprises a moving ring 31 disposed coaxially with the shaft 1 and the rod 2. This rotary ring 31 possesses a shape with symmetry of revolution, is suitable for turning about the axis of rotation (X), and is coupled to the upstream end 21 of the rod 2 by fastener means 24 identical to the above-mentioned fastener means 23 between the downstream end 12 of the shaft and the downstream end of the rod 22, for example splines 24. This fastening must be such that the upstream end 21 of the rod 2 entrains rotation of the moving ring 31 about its axis (X). Preferably, the moving ring 3 is made of a material that withstands wear such as polytetrafluoroethylene (Teflon®). The moving ring 31 includes permanent magnets that may be embedded within said moving ring 31.

Inside the housing 38, the sensor 3 also includes a winding 32 of conductor wire, preferably of copper wire. The winding 32 is secured to the housing 38 of the sensor 3 and is disposed coaxially with the shaft 1 and the rod 2. The winding 32 surrounds the moving ring 31 such that when the moving ring 31 is rotating, as a result of a difference in speed between the downstream end 12 of the shaft and the downstream end 22 of the rod, a current is induced in the conductive wire winding 32.

When the shaft is intact, the rod 2 is entrained to rotate at the same speed as the shaft 1 and no electric current is induced in the winding 32.

In the event of the shaft 1 breaking, the rod 2 continues to be driven to rotate at the same speed as the downstream end 12 of the shaft 1. Since the rotation of the downstream end 12 of the shaft 1 is no longer properly transmitted to the upstream end 11 of the shaft 1, phase shift occurs between the upstream end 21 of the rod 2 and the upstream end 11 of the shaft 1. The sensor 3 that measures the speed of the upstream end 21 of the rod 2 relative to the upstream end 11 of the shaft 1 by means of the assembly comprising the moving ring 31 and the conducive wire winding 32, detects this phase shift on an electric current being induced in the winding 32.

This phase shift, corresponding to breakage of the shaft 1 of the turbomachine, triggers a warning signal that is transmitted to electronic signal-processor means in order to switch off the fuel supply to the turbomachine. These electronic means may be a full authority digital electronic controller (FADEC) or some other device for switching off fuel supply, independent of and distinct from the FADEC. By way of example, these electronic means may be an micro-electromechanical system (MEMS) that is automatically powered by the induced electric current.

The warning signal may be transmitted by means of a radio transmitter 33 placed in the sensor 3 adjacent to the conductive wire winding 32. The current supplied by induction serves to provide the transmitter with electrical power.

The sensor 3 further includes an upstream plug 51 for sealing it and for axially retaining the upstream end 21 of the rod 2. For mounting on the sensor 3, the plug 51 has tapping 53 that co-operates with a thread 35 of the sensor 3.

The rod 2 may be rigid or flexible. For example it may be constituted by an optionally braided solid or hollow metal core, possibly reinforced by a flexible protective sheath, e.g. made of a plastics material or of rubber. The sheath may also be made of metal, such as steel, and it may be coated in a polymer that withstands high temperature, such as silicone. The flexibility of the rod 2 should facilitate inserting the rod 2 along the shaft 1 of the turbomachine rotor.

This flexibility should be dimensioned in such a manner as to avoid constituting a nuisance in terms of twisting and bending behavior that could give rise to parasitic phase shift.

Although FIG. 3 shows a preferred embodiment in which the sensor 3 is secured to the shaft 1, it is possible to devise a sensor 3 that is secured to the rod 2. It is also possible to envisage a sensor 3 that is secured neither to the shaft 1 nor to the rod 2, but that is located upstream from the upstream end 11 of the shaft 1 and the upstream end 21 of the rod 2.

The invention also provides a turbomachine including a shaft-breakage detector device as described above.

What is claimed is:

1. A device for detecting breakage of a turbomachine shaft, the device comprising:
   a shaft having an upstream end and a downstream end;
   a rod having an upstream end and a downstream end, and placed coaxially inside the shaft, the downstream end of the rod being securely fastened to the downstream end of the shaft and the upstream end of the rod being free to rotate relative to the upstream end of the shaft; and
   a sensor suitable for detecting a difference in speed of rotation between the upstream end of the rod and the upstream end of the shaft.

2. A device for detecting breakage of a turbomachine shaft according to claim 1, wherein the sensor comprises a housing securely fastened to the upstream end of the shaft.

3. A device for detecting breakage of a turbomachine shaft according to claim 2, wherein the sensor is in the form of a hollow cylinder coaxial with the shaft.

4. A device for detecting breakage of a turbomachine shaft according to claim 3, wherein the sensor comprises:
   a rotary moving ring including permanent magnets that is disposed coaxially with the shaft, being capable of turning about the axis of the shaft and being coupled to the upstream end of the rod; and
   a conductive wire winding secured to the housing of the sensor and coaxial with the shaft.

5. A device for detecting breakage of a turbomachine shaft according to claim 4, wherein the winding surrounds the moving ring.

6. A device for detecting breakage of a turbomachine shaft according to claim 4, wherein the moving ring and the upstream end of the rod are coupled together by splines.

7. A device for detecting breakage of a turbomachine shaft according to claim 4, wherein the sensor detects the difference in speed of rotation between the upstream end of the rod and the upstream end of the shaft by detecting a phase shift on an electric current induced in the winding.

8. A device for detecting breakage of a turbomachine shaft according to claim 1, wherein the downstream end of the shaft and the downstream end of the rod include complementary splines.

9. A device for detecting breakage of a turbomachine shaft according to claim 1, wherein the sensor includes an upstream plug.

10. A turbomachine including a device for detecting breakage of a turbomachine shaft according to claim 1.

11. A device for detecting breakage of a turbomachine shaft according to claim 4, further comprising a radio transmitter placed in the sensor adjacent to the winding which transmits a warning signal when breakage of the turbomachine shaft is detected due to the difference in speed of rotation between the upstream end of the rod and the upstream end of the shaft.

* * * * *